United States Patent Office 3,025,287
Patented Mar. 13, 1962

3,025,287
DISAZO-DYESTUFFS INSOLUBLE IN WATER
Joachim Ribka, Offenbach (Main), Germany, assignor to Farbwerke Hoechst Aktiengesellschaft vormals Meister Lucius & Bruning, Frankfurt am Main, Germany, a corporation of Germany
No Drawing. Filed May 19, 1960, Ser. No. 30,101
Claims priority, application Germany Apr. 8, 1960
5 Claims. (Cl. 260—176)

The present invention relates to new disazo-dyestuffs insoluble in water and to a process for preparing the same; more particularly it relates to dyestuffs corresponding to the following general formula

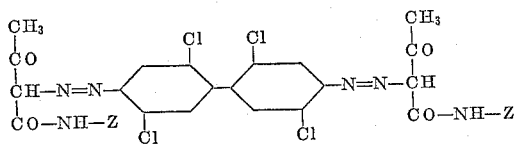

wherein Z represents a polycyclic radical of the naphthalene, anthracene, acenaphthene, pyrene, chrysene or phenanthrene series.

In U.S. patent application Serial No. 11,977, filed March 1, 1960, in the name of Joachim Ribka, is disclosed a process for the manufacture of disazo-dyestuffs insoluble in water wherein the tetrazonium compound of 4,4'-diamino-2,2',5,5'-tetrachlorodiphenyl is coupled in substance, on the fiber or on another substratum with acetoacetylamino compounds of the benzene series with the exception of the 1-acetoacetylamino-2,4-dimethylbenzene. According to said process there are obtained valuable dyestuffs which are yellow pigments insoluble in water. These pigments have good properties of fastness to solvents and light and are therefore particularly suitable for coloring plastic masses, for pigment printing and for specialized technical uses in the lacquer, wall paper, and paper industries.

Now, I have found that there are obtained dyestuffs of similar good properties of fastness by coupling in substance, on the fiber or on another substratum the tetrazonium compounds of 4,4'-diamino-2,2',5,5'-tetrachlorodiphenyl with acetoacetylamino compounds of the polycyclic aromatic series.

The following examples serve to illustrate the invention but they are not intended to limit it thereto, the parts being by weight unless otherwise stated.

Example 1

32.2 parts of 4,4'-diamino-2,2',5,5'-tetrachlorodiphenyl are stirred for some hours with 160 parts of 5 N-hydrochloric acid and tetrazotized, after dilution with water and ice at 0° C., with 40 parts by volume of a 5 N sodium nitrite solution.

After being clarified with kieselguhr, the tetrazo solution so obtained, is introduced at room temperature, while stirring, into a suspension of 46 parts of 1-acetoacetylaminonaphthalene in acetic acid prepared by dissolving this compound in dilute hydroxide solution and precipitating it with glacial acetic acid in the presence of a reaction product from about 20 mols of ethylene oxide and 1 mol of oleyl alcohol. By simultaneously introducing a dilute sodium acetate solution, the reaction medium is maintained acetic during the coupling. After completion of the coupling, the whole is heated at the boil and maintained at the boil for 1 hour. The dyestuff is then filtered off with suction, washed and dried. There are obtained about 80 parts of a yellow dyestuff powder.

The coupling may also be carried out in the presence of a carrier which is suitable for the preparation of color lakes.

In order to prepare a polyvinylchloride dyeing, a mixture of 0.2 part of this dyestuff and 1 part of titanium dioxide is incorporated within 10 minutes at 100° C. on the roller mill into a mixture of 66 parts of polyvinyl chloride, 17 parts of dioctylphthalate and 17 parts of dibutylphthalate, and the dyeing thus obtained is pressed for 5 minutes at 160° C. to obtain foils. The greenish yellow dyeing thus obtained possesses a good fastness to light and bleeding.

When a printing ink is prepared from 5 parts of the dyestuff, 35 parts of aluminum hydroxide and 60 parts of linseed oil varnish, and art printing paper is printed with this printing ink, greenish yellow prints of high transparency and good fastness to light and solvents are obtained.

By incorporating the dyestuff into nitrocellulose lacquer, there may be obtained greenish yellow lacquerings possessing a good heat resistance as well as a good fastness to overspraying and light.

Example 2

Cotton fabric is padded on the foulard with the following solution and dried:

16.5 grams of 1-acetoacetylaminonaphthalene are pasted with 30 cc. of Monopole Brilliant Oil and 14 cc. of sodium hydroxide solution of 38° Bé., the whole is dissolved by the addition of 500 cc. of hot water and made up to 1 liter with cold water.

The dried fabric is developed on the foulard with the following solution:

10 grams of 4,4'-diamino-2,2',5,5'-tetrachlorodiphenyl are pasted with 0.5 gram of a reaction product from about 20 mols of ethylene oxide and 1 mol of octadecyl alcohol, 24 cc. of hydrochloric acid of 20° Bé. and 50 cc. of cold water, and the whole is dissolved by the addition of water. 4.8 grams of sodium nitrite, dissolved in 24 cc. of water, are then added together with ice, while stirring well.

The tetra solution thus obtained is introduced into a bath containing 2 grams of a reaction product from 20 mols of ethylene oxide and 1 mol of octadecyl alcohol, 20 cc. of acetic acid of 50% strength and 30 grams of sodium acetate. The whole is then made up to 1 liter with cold water. After an air passage of about 30 seconds, the coupling is completed by a passage through hot water. The material is then rinsed, soaped for 15 minutes at 95° C. with a solution containing per liter of water 1 gram of a reaction product from about 10 mols of ethylene oxide and 1 mol of isododecylphenol and 3 grams of sodium carbonate, rinsed and dried.

A yellow dyeing of good properties of fastness is obtained.

In the following table are given further coupling components which can be coupled in substance with the same diazo component to yield disazo dyestuffs having the tints given in the table:

| Coupling component | Tint |
|---|---|
| 1-acetoacetylamino-2-methylnaphthalene | greenish yellow. |
| 2-acetoacetylaminonaphthalene | greenish yellow. |
| 2-acetoacetylamino-1-methylnaphthalene | greenish yellow. |
| 1-acetoacetylamino-2-methoxynaphthalene | yellow. |
| 1-acetoacetylamino-2-methoxynaphthalene | yellow. |
| 1-acetoacetylamino-4-methoxynaphthalene | yellow. |
| 2-acetoacetylamino-3-methoxynaphthalene | yellow. |
| 1-acetoacetylamino-4-acetylaminonaphthalene | reddish yellow. |
| 1-acetoacetylamino-4-benzoylaminonaphthalene | reddish yellow. |
| 1-acetoacetylamino-4-chloronaphthalene | greenish yellow. |
| 1-acetoacetylamino-5,8-dichloronaphthalene | yellow. |
| 1-acetoacetylamino-4-cyanonaphthalene | yellow. |
| 1-acetoacetylamino-5-nitronaphthalene | yellow. |

I claim:
1. Water-insoluble disazo-dyestuffs corresponding to the following general formula

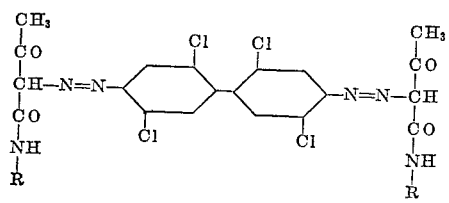

wherein R is a member selected from the group consisting of naphthyl, methylnaphthyl, methoxynaphthyl, chloronaphthyl, nitronaphthyl, cyanonaphthyl, acetylaminonaphthyl, benzoylaminonaphthyl, dichloronaphthyl.

2. The dyestuff corresponding to the following formula

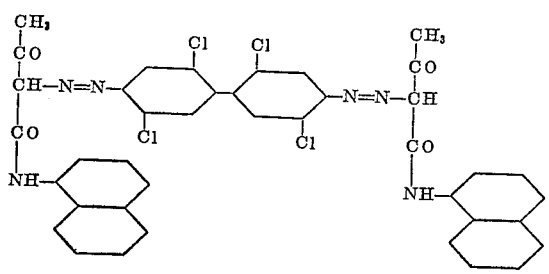

3. The dyestuff corresponding to the following formula

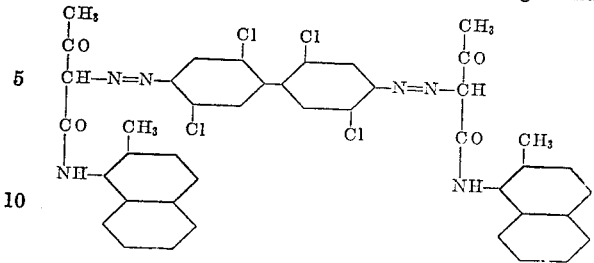

4. The dyestuff corresponding to the following formula

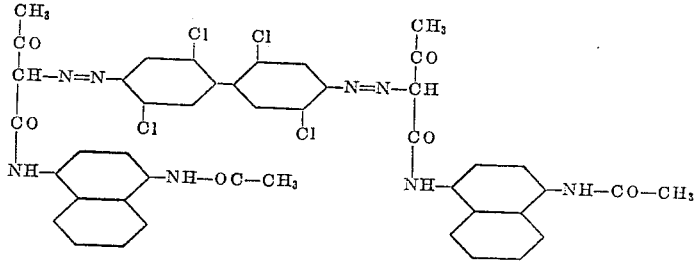

5. The dyestuff corresponding to the following formula

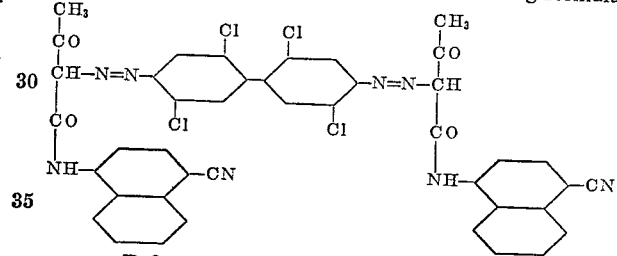

References Cited in the file of this patent
UNITED STATES PATENTS
2,880,177    Lyons _____ Mar. 31, 1959